March 13, 1928.
A. J. GARD
1,662,148
TRANSPORTATION TRUCK
Filed Oct. 8, 1926
3 Sheets-Sheet 1
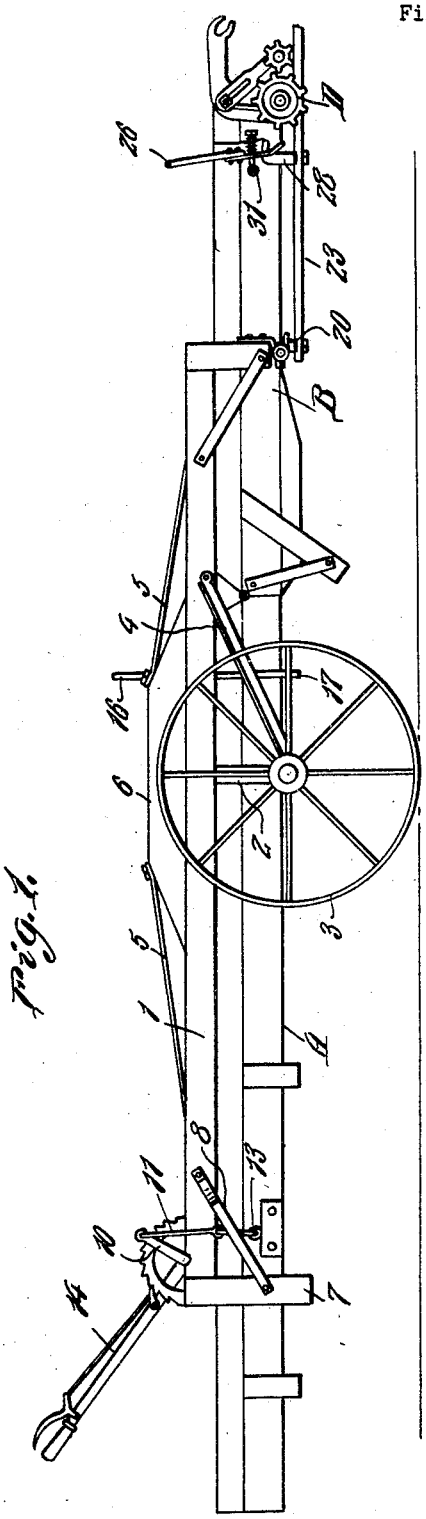
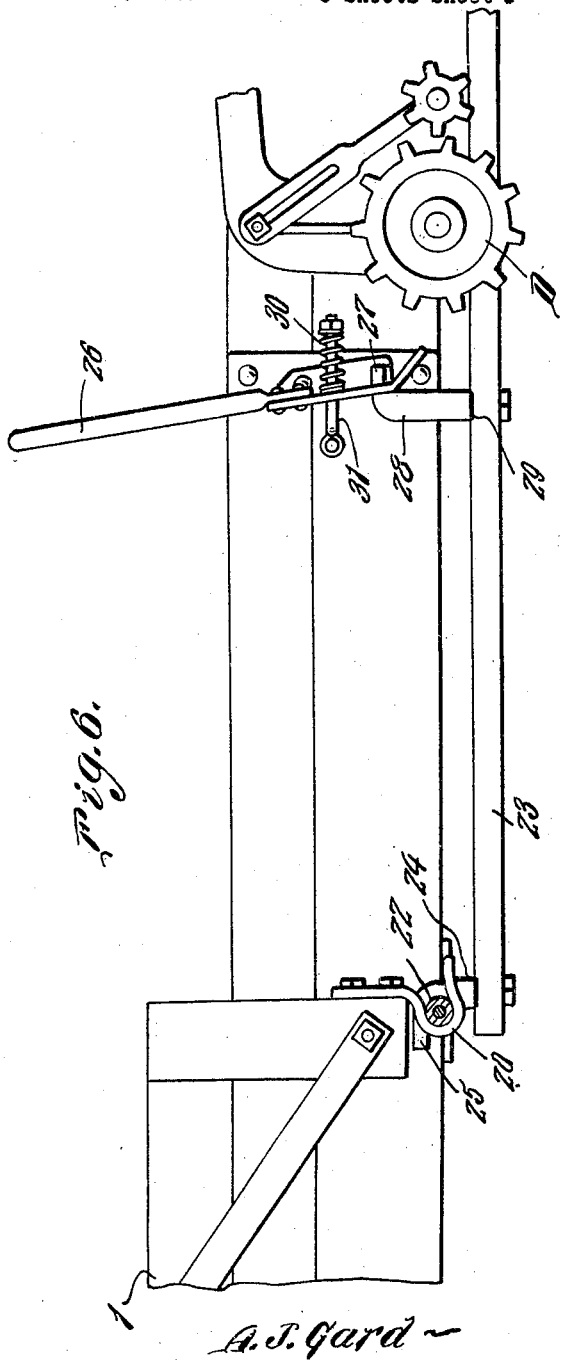
A. J. Gard
INVENTOR
BY Victor J. Evans
ATTORNEY March 13, 1928.
A. J. GARD
1,662,148
TRANSPORTATION TRUCK
Filed Oct. 8, 1926
3 Sheets-Sheet 2
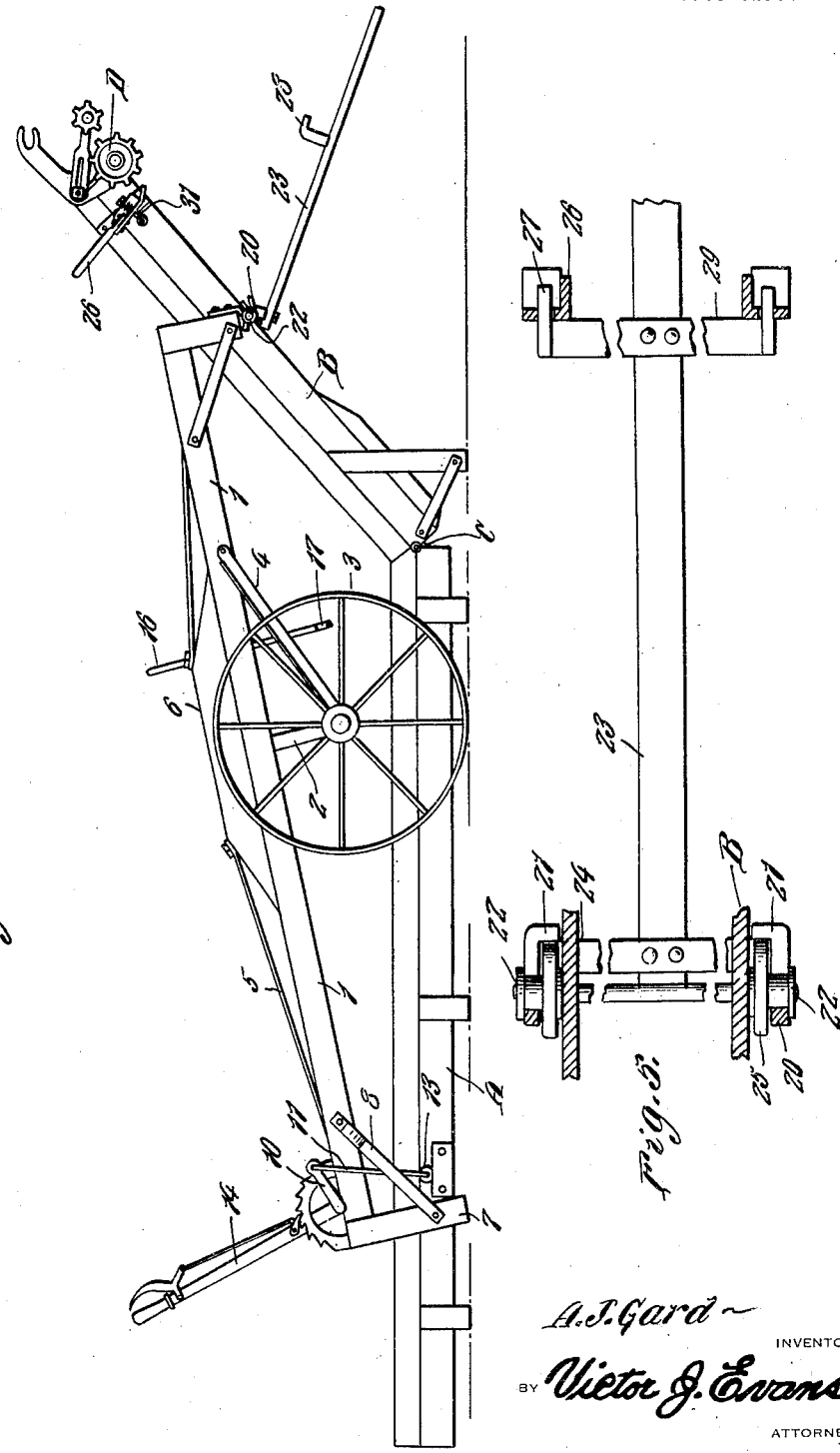

March 13, 1928.  A. J. GARD  1,662,148
TRANSPORTATION TRUCK
Filed Oct. 8, 1926  3 Sheets-Sheet 3
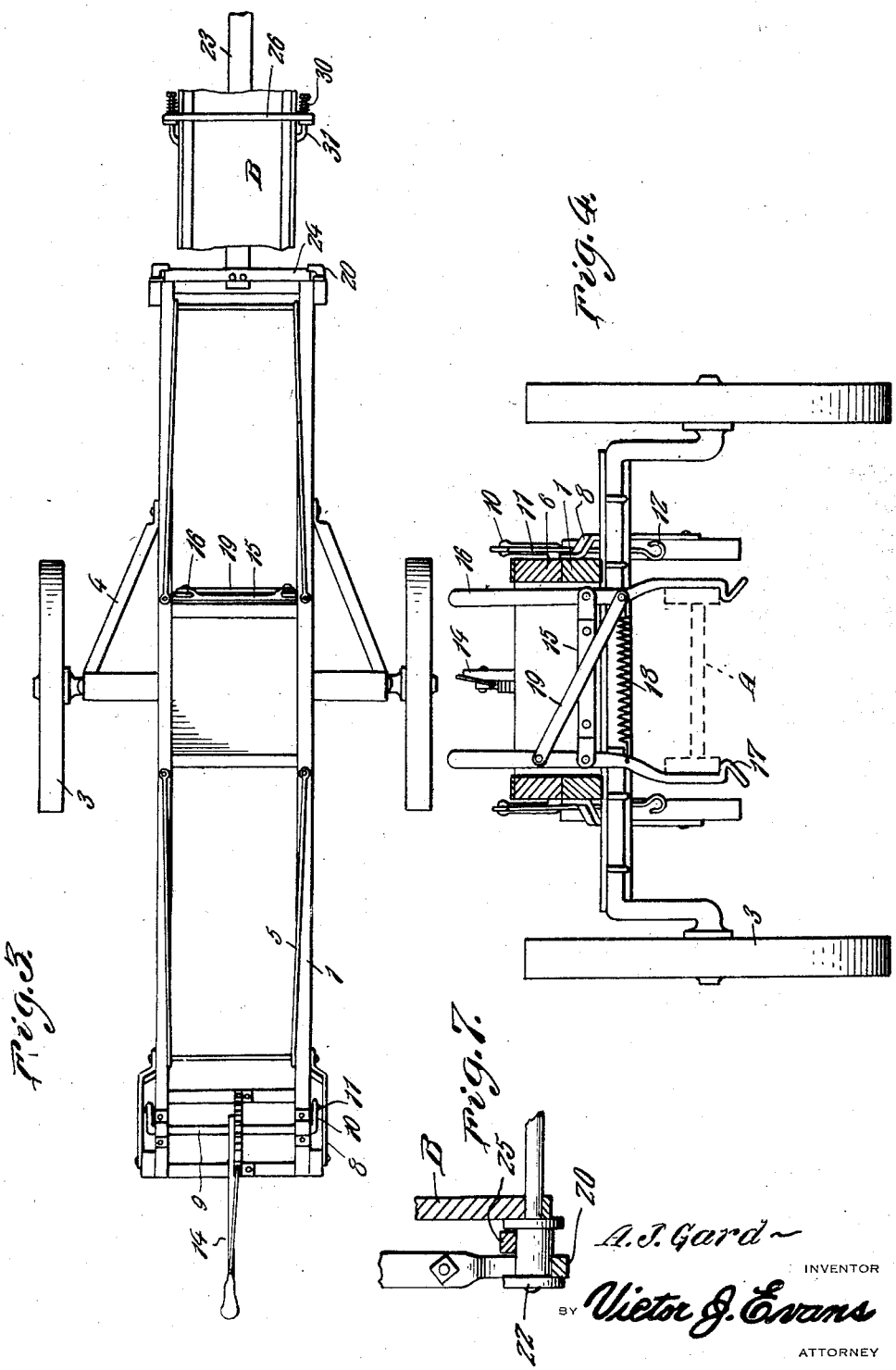

Patented Mar. 13, 1928.

1,662,148

UNITED STATES PATENT OFFICE.

ALVIN J. GARD, OF BEAVER CROSSING, NEBRASKA.

TRANSPORTATION TRUCK.

Application filed October 8, 1926. Serial No. 140,326.

This invention relates to a truck for transporting the feeding conveyor of a corn sheller, the general object of the invention being to provide means whereby the conveyor can be easily and quickly attached to the truck and moved from place to place.

A further object of the invention is to so construct the truck that the conveyor can be easily set up and connected with the sheller.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation, showing the improved truck, with the conveyor attached thereto.

Figure 2 is a similar view but showing the truck as partly disengaged from the conveyor and with the conveyor set up and ready to be attached to the corn sheller.

Figure 3 is a plan view of the truck and showing parts of the conveyor.

Figure 4 is a central transverse sectional view.

Figure 5 is a top plan view of the tongue, with the parts to which it is attached in section.

Figure 6 is an elevation of the front part of Figure 1, showing the tongue in raised position.

Figure 7 is a sectional detail view through the means for connecting the rear end of the tongue to the front legs of a truck and to the front part of the conveyor.

In these views, 1 indicates the elongated rectangular frame of the truck which is fastened to the yoke-shaped axle 2 to which the two wheels 3 are rotatably connected, suitable braces 4 being provided between the axle and frame and truss rods 5 connect the ends of the frame with the central enlargement 6 thereof. A leg 7 is fastened to each corner of the frame and braces 8 are provided for these legs. A shaft 9 is journaled in the rear part of the frame and its crank ends 10 have the links 11 attached thereto. The lowermost link of each set is formed with a hook 12 for engaging an eye 13 placed on each side of the section A of the drag feed or conveyor device for a corn sheller. A hand lever 14 is fastened to the shaft so that when the hand lever is operated, the shaft will be rocked and thus the rear end of the section A will be lifted off of the ground.

The central part of the truck carries a bracket 15 to each end of which is pivoted a vertically arranged lever 16 having a hook 17 at its lower end. The lower ends of the levers move toward each other by a coil spring 18 and a diagonal link 19 connects the two levers together in such a manner that the movement of one lever will be communicated to the other. The lower parts of the levers are of a spring nature and these parts are adapted to pass over the sides of the section A until their hooks 17 engage the lower side edges of the said section and thus support the front part of the section in raised position. By pushing one of the levers 16 toward the other lever, the hook parts will be moved away from each other so that the section of the conveyor will be released by said hook portions.

The front legs 7 of the truck are each provided with a hook 20, the beak of which is provided with a right angle extension 21 which extends inwardly, as shown in Figure 5. These hooks are adapted to engage the projections 22 at the sides of the section B of the conveyor which is hingedly connected with the section A, as shown at C, and has the mechanism D at its outer end for engaging the sheller, as is well known.

A tongue 23 has a yoke-shaped bracket 24 secured to its inner end and this bracket is formed with the hook-shaped extremities 25 for engaging the projections 22 to detachably connect the tongue with the section B and with the front end of the truck. The extremities 25, when the tongue is moved to a position parallel with the section B, will have their shanks engage the parts 21 of the hooks 20 so that the tongue will be locked to the section B, but when the tongue is swung downwardly, as shown in Figure 2, the shanks will leave the parts 21 of the hooks 20 so that the hook parts 25 can be freed of the projections 22 so that the tongue can be detached from the device.

The tongue is held in raised position by means of a yoke-shaped member 26 pivotally connected with the section B adjacent the outer end thereof and having a hole adjacent each end thereof for engaging a projection 27 formed on a part 28 at each end of a member 29 which is fastened to the tongue. Springs 30 on the bolts 31, fastened to the sides of the section B, act to hold the yoke-shaped member with its holes in engagement with the projections 27. When the tongue is to be released, it is simply necessary to rock the member 26 so that its holes will pass from over the projections 27 when the front part of the tongue will drop, as shown in Figure 2. Then its rear end can be removed, if desired, as before explained.

From the foregoing, it will be seen that when the truck is to be attached to the conveyor device, it is pushed over the device and the said truck tilted until its hooks 20 can be shoved over the projections 22 and the links 11 are connected with the eyes 13. The parts will then be in a position as shown in Figure 2. Then by pressing down upon the outer end of the section B, the middle part of the conveyor device will be raised until the front part of the section A passes between the levers 16, when they will be engaged by the hooks 17 and then the conveyor device will be supported by the truck with the device in a straight position, as shown in Figure 1.

After the device has been moved to its point of use, either by hand or by a team or tractor, one of the levers 16 is manipulated to move the hook parts 17 away from each other so that the central part of the conveyor device will drop and then the parts will assume the position shown in Figure 2. In this position, the parts are perfectly balanced, so that the front section B will remain in any semi-upright position ready to be attached to a corn sheller without any support while the device is still connected with the truck. The tongue can be used or not as desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a conveyor apparatus, a truck for transporting the same comprising an elongated frame, an axle connected with the center of the frame, a wheel at each end of the axle, said axle and wheels supporting the frame so that it can tilt, depending means at the rear of the truck for attachment to a part of the conveyor apparatus, means adjacent the center of the truck for attachment to another part of the conveyor apparatus and depending means at the front part of the truck for attachment to a further part of the apparatus.

2. In combination with a conveyor apparatus, a truck for transporting the same comprising an elongated frame, an axle connected with the center of the frame, a wheel at each end of the axle, means at the rear of the truck for attachment to a part of the conveyor apparatus, means adjacent the center of the truck for attachment to another part of the conveyor apparatus, means at the front part of the truck for attachment to a further part of the apparatus, a tongue for the truck, means for detachably connecting it to the front end of the truck and to a part of the conveyor apparatus and means for detachably connecting a part of the tongue to the front end of the apparatus.

3. In combination with a conveyor apparatus, a truck for transporting the same comprising an elongated frame, an axle at the center thereof, a wheel at each end of the axle, a rock shaft at the rear end of the truck, means for connecting the shaft with the rear part of the apparatus, means for rocking the shaft to lift the apparatus, a pair of vertically arranged levers at the center of the truck, each lever having a hook at its lower end for engaging a part of the apparatus, means for permitting the levers to be actuated to release the apparatus, legs at the front end of the truck, hooks thereon for engaging parts at the front of the apparatus, a tongue, means for detachably connecting the end of the tongue to the front part of the apparatus and means at the front part of the apparatus and on the tongue for holding the tongue in parallel relation to the front part of the apparatus.

In testimony whereof I affix my signature.

ALVIN J. GARD.